United States Patent [19]

Wadhwa

[11] Patent Number: 4,514,309

[45] Date of Patent: Apr. 30, 1985

[54] CROSS-LINKING SYSTEM FOR WATER BASED WELL FRACTURING FLUIDS

[75] Inventor: Suresh K. Wadhwa, Midland, Tex.

[73] Assignee: Hughes Tool Company, Houston, Tex.

[21] Appl. No.: 453,051

[22] Filed: Dec. 27, 1982

[51] Int. Cl.³ .............................................. C09K 3/00
[52] U.S. Cl. ............................... 252/8.55 R; 166/283;
166/308; 524/44; 524/45; 524/55
[58] Field of Search .................... 252/8.55 R; 166/283,
166/308, 280, 281; 524/42, 43, 44, 45, 55;
525/337, 364

[56] References Cited

U.S. PATENT DOCUMENTS

| | | | |
|---|---|---|---|
| 3,024,191 | 3/1962 | Jones | 252/8.55 |
| 3,079,332 | 2/1963 | Wyant | 252/8.5 |
| 3,096,284 | 7/1963 | Slate | 252/8.55 |
| 3,768,566 | 10/1973 | Ely | 166/308 |
| 3,794,115 | 2/1974 | Skagerberg | 166/294 |
| 3,898,165 | 8/1975 | Ely | 252/8.55 |
| 3,981,363 | 9/1976 | Gall | 166/270 |
| 4,018,286 | 4/1977 | Gall | 166/295 |
| 4,033,415 | 7/1977 | Holtmyer | 166/308 |
| 4,039,029 | 8/1977 | Gall | 166/294 |

*Primary Examiner*—Josephine L. Barr
*Attorney, Agent, or Firm*—Robert A. Felsman; Charles D. Gunter, Jr.

[57] ABSTRACT

A cross-linking system is shown for use in a water based well fracturing fluid which includes a mixture of a titanate constituent and a boron constituent. The mixture is effective to produce a cross-linked water based fracturing fluid which is shear stable at normal fracturing pump rates and which is temperature stable at elevated well temperatures.

4 Claims, No Drawings

CROSS-LINKING SYSTEM FOR WATER BASED WELL FRACTURING FLUIDS

BACKGROUND OF THE INVENTION

The present invention relates generally to a fluid and method for fracturing oil well formations and, more specifically, to a cross-linking system for use with such a fracturing fluid to increase viscosity of the fluid.

In fracturing oil and gas wells, a special fluid referred to as a fracturing fluid is pumped down the well to contact the formation to be fractured. The fluid can contain proppant materials such as glass beads, nylon pellets, walnut shell fragments, or the like. The pressure of the fluid composition is increased by pumps located at the surface until the formation is fractured by the hydraulic pressure. The fracturing fluid is pumped at a rate sufficient to open a fracture in the exposed formation, and extend the fracture from the well bore into the formation. Continued pumping of the fracturing fluid containing a propping agent into the fracture results in proppant placement within the fractured zone. Following the treatment, the fracturing fluid is recovered from the well, leaving the proppant remaining in the fracture, thereby preventing the complete closure of the formation and forming a permeable channel extending from the well bore into the formation.

A fracturing fluid widely used in fracturing operations includes a gum such as a guar gum and water. When these two materials are mixed together in proper proportions, a viscous gel is formed. The guar gum is usually added to the water in the form of a dry powder and upon hydration forms gels of varying viscosities. The actual viscosity which is achieved in the resulting fracturing fluid is dependant upon the relative proportions of water and gum used. Other things being equal, the viscosity of the resultant fluid increases directly with the amount of additional gum used.

While adding increased amounts of gum to the base fluid is one technique for increasing the viscosity of the fluid, such a practice can become uneconomical because of the cost of the gum. A more efficient and economical practice involves the use of cross-linking agents. The cross-linking agents used in very small amounts, can give large increases in apparent viscosity of the base fluid. The cross-linkers work by chemically linking the linear polymers in the base fluid together, further restricting the ability of the water molecules to move. Some common cross-linking agents include borates, aluminum, antimony and titanium containing compounds including the so-called organotitanates. Each of the known cross-linking agents generally has certain desirable properties coupled with certain less than desirable properties.

The selection of the proper cross-linking agent is based upon the type of gelling agent being used, the pH of the gel system, the predicted fluid temperature, and other factors. Thus, in the case of borates, the pH of the base fluid needs to be in the range of about 8–10 for cross-linking, while with many of the other cross-linkers such as the metallic ions, the pH will need to be in the range of about 2–8, depending upon the base polymer used.

Another concern with the choice of cross-linking agent is the shear stability of the fluid while pumping down the tubular conduit and through the perforations into the formation. The shear stability can be evaluated in the laboratory the shearing the cross-linked gel with a shearing device and determining the time required for the cross-linked gel structure to reappear or reheal. Following shear, the cross-linked fluids should reheal rapidly under down hole conditions so propping agents will be transported and not dropped from the fluid inside the tubular conduit. The borate cross-linked system generally stands shear forces adequately for most fracturing applications while the organotitanate cross-linked fluids cannot take higher shear rates.

The temperature stability of the fracturing fluid is also of concern. Prolonged exposure of the fracturing fluid to the temperatures encountered in the well bore causes the fluid to "break" or lose viscous nature. Many fracturing fluids lose a large portion of their viscosity on heating to 200° F. and a majority lose their viscosity upon heating to 300° F. It is necessary for the fracturing fluid to remain viscous in the fracture long enough to permit build-up and maintenance of sufficient pressure to open a fracture. Additionally, the viscous fracturing fluid can support propping agents suspended therein. A desirable fracturing fluid should retain its gelled or viscous nature for up to 8 hours in the temperature range of 235°–300° F. The organotitanate cross-linked fluids are temperature stable in the above range but are shear sensitive. The borate cross-linked fluids while shear stable tend to be temperature sensitive.

SUMMARY OF THE INVENTION

There exists a need, therefore, for a cross-linking system for water based well fracturing fluids which will increase the viscosity of the well treating fluids by a method which is simple and economical.

There also exists a need for such a cross-linking system which will give a fracturing fluid which is shear stable at normal fracturing pump rates and which is temperature stable at elevated well temperatures.

The cross-linking system of the present invention for water based well fracturing fluids comprises a mixture of a titanate constituent, preferably an organotitanate constituent, with a boron constituent. Preferably, the organotitanate constituent is a tyzor chelate ester. The organotitanate constituent can be a mixture of a first organtitanate compound having a lactate base and a second organotitanate compound having triethanolamine base. The boron constituent is preferrably selected from the group consisting of boric acid, sodium tetraborate, and mixtures thereof.

A liquid cross-linking system for water based fracturing fluids comprises an organotitanate constituent, a boron constituent, and a liquid carrier for the organotitanate constituent and the boron constituent. The liquid cross-linking system, when added to a water based fracturing fluid, is effective to produce a cross-linked water based fracturing fluid which is shear stable at normal fracturing pump rates and temperature stable at well temperatures ranging up to about 235°–300° F. for up to 8 hours.

In the method of fracturing a subterranean formation, water and a hydratable polymer capable of gelling in the presence of the cross-linking system are blended together to form a base fluid. A cross-linking system is then added to the base fluid to cross-link the hydratable polymer. The cross-linking system comprises a mixture of an organotitanate constituent and a boron constituent in a liquid carrier. The cross-linked water based fracturing fluid is then pumped into the subterranean formation to fracture the formation. The cross-linking system is effective to produce a cross-linked water based fracturing fluid which is shear stable at normal fracturing pump rates and temperatures stable at well temperatures ranging up to about 235°-300° F. for up to 8 hours.

Additional objects, features, and advantages will be apparent in the written description which follows.

DETAILED DESCRIPTION OF THE INVENTION

The present liquid cross-linking system for water based fracturing fluids comprises a titanate constituent, preferably an organotitanate constituent, a boron constituent, and a liquid carrier for the organotitanate constituent and the boron constituent. The organotitanate constituent is preferably of the type known as tyzor chelate esters. The preferred organotitanate constituent is a mixture of a first and second organotitanate compounds. The first compound is known as "Tyzor LA" which is an organotitanate compound having a lactate base. The "Tyzor LA" contains approximately 8.2% titanium with approximately 13.7% as $TiO_2$. It is supplied as 50% product in water and is a clear, light, amber liquid having a specific gravity of 1.21 (25° C./25° C.), and an approximate viscosity of 8 cps (@25° C.;77° F.). The thickening point of the "Tyzor LA" is approximately $-10°$ C. and it is miscible with water.

The second organotitanate compound known as "Tyzor TE" is a tyzor chelate ester having a triethanolamine base. The "Tyzor TE" has approximately 8.3% titanium in the product with approximately 13.7% as $TiO_2$. It is supplied as 80% in isopropanol and is a pale yellow liquid having a specific gravity 1.06 (25° C./25° C.). It has an approximate viscosity of 90 cps (@25° C.;77° F.), a thickening point of approximately $-35°$ C., and is soluble in water and isopropanol.

The organotitanate constituents are selected so that the first organotitanate compound is apparently more active for cross-linking water based fracturing fluids having a pH in the range of about 7-8 and the second organotitanate compound is active for cross-linking water based fracturing fluids having a pH in the range of about 7.5-9. It is known that titanium lactate can tolerate some reduction in pH; any increase in pH promotes its reactivity. Titanium triethanolamine can tolerate some increase in pH but is readily reactive as the pH is lowered. The boron constituent of the invention can be any convenient source of borate ions including the alkali metal and the alkaline earth metal borates and boric acid. Sodium tetraborate or borax as it is generally known and boric acid are preferred. The most preferred boron constituent is a mixture of boric acid and sodium tetraborate with two parts by weight boric acid being used for every 1 part by weight sodium tetraborate. However, it should be understood that boron constituents suitable for use in the invention can include any boron compound which will supply borate ions in an aqueous fluid; for example, sodium biborate, potassium tetraborate, and the like.

The liquid carrier for the organotitanate constituent and the boron constituent is preferably a water soluble alcohol represented by the general formula: $C_nH_{2n+1}OH$. Where n is an integer in the range of about 1 to 5. Preferred alcohols are methanol, n-propanol, and isopropanol with the most preferred alcohol being methanol.

The boron constituent is preferably present in the range of about 0.3 to 0.7 pounds by dry weight per gallon of liquid cross-linking system and most preferably about 0.4 pounds by dry weight. The weight ratio of active titanium contributed by the organotitanate constituent in the liquid system to the boron constituent in the liquid system is in the range of about 1:2 to 1:4 parts by weight active titanium to parts by weight boron constituent based upon the dry weight of active titanium to the dry weight of boron constituent in the liquid system and most preferably about 1:3 parts by weight.

The liquid cross-linking system is prepared by first dissolving the boron constituent in methanol. The organotitanate compounds are then added and mixed thoroughly. Where the titanium lactate is commercially supplied as a solution containing 8.2% active titanium and the titanium triethanolamine is commercially supplied as a solution containing 8.3% active titanium, each gallon of cross-linking system will contain approximately 16.66% by volume titanium lactate, 16.66% by volume titanium triethanolamine and 66.66% by volume methanol.

A water based fracturing fluid can be prepared which comprises water, the cross-linking system described, and a hydratable polymer capable of gelling in the presence of the cross-linking system. The hydratable polymer useful in the present invention can be any hydratable polysaccharide having a molecular weight of greater than about 100,000. It is believed that most hydratable polysaccharides have molecular weights of less than about 3,000,000. Suitable hydratable polysaccharides are the galactomannan gums, glucomannan gums, and derivatives thereof, and cellulose derivatives. Hydratable galactomannan gums and glucomannan gums are naturally occurring, while cellulose is rendered hydratable by reacting cellulose with hydrophillic constituents. Examples of hydratable polymers are guar gum, guar gum derivitives, locust bean gum, karaya gum, CMC, CMHEC, and HEC. The preferred hydratable polymers are derived guar gums with the most preferred being hydroxypropyl guar. Suitable hydroxypropyl guars are commercially available and their method of preparation is taught, for instance, in U.S. Pat. No. 3,794,115, issued Feb. 26, 1974, to Skagerberg, entitled "Process for Forming Borehole Plugs."

Any of a variety of conventional propping agents may be employed with the fracturing fluid of the present invention such as quartz sand grains, tempered glass beads, rounded walnut shell fragments, aluminum pellets, nylon pellets, and similar materials. Such agents are generally used in concentrations between about 1 to 8 pounds per gallon of the fracturing fluid composition, but higher or lower concentrations can be used as required.

The cross-linked fracturing fluid of the present invention is used by pumping it into a well bore traversing the subterranean formation to be fractured. The fracturing fluid is pumped at a rate sufficient to fracture the formation and to place propping agents into the fracture.

The water based fracturing fluid can be prepared for use by adding fresh water which preferably contains 2-10% KCl or NaCl or ½% $CaCl_2$ to avoid damaging water swellable clay formations. The water's pH should be between about 6.0-9.0 or the pH should be adjusted to this range and a suitable buffer such as sodium bicarbonate can be added. A commercially available defoamer, if needed, can be added to the water in a blender tub and the water circulated at a rate of 18-20 barrels per minute. The KCl is added to the circulating water. A surfactant can be added to the blender tub while adding the KCl. The hydratable polymer is then added to the blender tub. When about ⅓ to ½ of the hydratable polymer has been added, conventional stabilizers such as sodium thiosulfate and sodium hydrosulfate can be added to the fluid. After all of the polymer has been added, the fluid is circulated for five minutes to assure a uniform gel.

The water based fracturing fluid thus prepared will preferably contain about 20 to 50 pounds of hydratable polymer per 1,000 gallons of water used and most preferably contain 30 to 45 pounds of hydratable polymer per 1,000 gallons of water used.

After the hydratable polymer and the water base have been mixed for a time sufficient to form a hydrated gel, a quantity of the cross-linking system of the invention is mixed with the hydrated gel, and the mixture is pumped to the well bore as the cross-linking reaction takes place. Propping agents are generally added to the hydrated gel prior to the addition of the cross-linking system and as the hydrated gel is pumped to the well bore. The liquid cross-linking system is preferably added in the range of about 0.50 to 2.50 gallons of liquid cross-linker per 1,000 gallons of water used and most preferably about 1.0 to 1.6 gallons of liquid cross-linker per 1,000 gallons of water used.

Once the cross-linked fracturing fluid has been pumped into the subterranean formation and a fracture has been formed, it is desirable to "break" the gel into a low viscosity fluid so that it can be either pumped or produced from the formation through the well bore. The fracturing fluid of the present invention will break into low viscosity fluid with time and temperature. Alternatively, known breakers may be included in the fracturing gel of the present invention as an optional element.

The following are examples of the cross-linked fracturing fluid of the present invention embodying the cross-linking system discussed above and are intended to serve primarily for the purpose of illustration. The invention, in its broader aspects, is not to be construed as limited thereto.

TEST PROCEDURE

Four samples were prepared by dissolving 167 pounds KCl, 10 pounds of sodium bicarbonate buffer, 10 pounds of sodium thiosulfate, and 1 pound of sodium hydrosulfate in 1,000 gallons of water. The indicated quantity of hydroxypropyl guar was then hydrated in the water base and the cross-linking system of the invention was added to each sample in the quantity shown.

The cross-linking system was made by dissolving the boric acid in a methanol carrier liquid to which was added the titanium lactate and titanium triethanolamine. The liquid cross-linking system was 16.66% by volume titanium lactate, 16.66% by volume titanium triethanolamine, 66.66% by volume methanol, and 5% by weight boric acid (i.e., 0.4172 pounds of boric acid for each gallon of cross-linking system).

The properties of the cross-linked fracturing fluid thus formed were studied and the results are shown in the tables which follow. For various rheological parameters, a Fann model 50C rotational viscometer (Fann Instrument Co.) was used. Shear stress on a rotational viscometer is the force exerted on the walls (torque on the bob) divided by the surface area. The shear rate is the relative velocity of the stationary bob and rotating cup divided by the gap distance.

The slope of the plot of shear stress versus shear rate is donoted n' and is called the flow behavior index. The consistency index, donoted as k', is the stress at a unit rate.

The apparent viscosity is an indication of flow resistance. It changes for different values of shear rate and is given in centipoise. It has been estimated that a 100 rpm (shear rate=170 sec$^{-1}$) Fann 50C test approximates normal fracturing pump rates in the field.

The fluid loss test were run using filter paper and test procedure as outlined in the AMERICAN PETROLEUM INSTITUTE (API) Recommended Practice 39.

| SAMPLE PREPARATION | | | | |
|---|---|---|---|---|
| Ingredients | Sample I | Sample II | Sample III | Sample IV |
| Water (gals) | 1000 | 1000 | 1000 | 1000 |
| KCl (pds) | 167 | 167 | 167 | 167 |
| Hydroxypropyl guar (pds) | 30 | 35 | 40 | 45 |
| Sodium bicarbonate (pds) | 10 | 10 | 10 | 10 |
| Sodium thiosulfate (pds) | 10 | 10 | 10 | 10 |
| Sodium hydrosulfate (pds) | 1 | 1 | 1 | 1 |
| Cross-linking system (gals) | 0.90 | 1.04 | 1.20 | 1.32 |

TABLE I

| APPARENT VISCOSITY (CP) VS TIME AT 250° F. | | | | | | | | |
|---|---|---|---|---|---|---|---|---|
| Sample | 1 hr | 2 hr | 3 hr | 4 hr | 5 hr | 6 hr | 7 hr | 8 hr |
| I | 260 | 215 | 190 | 165 | 145 | 130 | 110 | 105 |
| II | 305 | 260 | 230 | 205 | 185 | 170 | 160 | 145 |
| III | 445 | 370 | 320 | 270 | 245 | 215 | 200 | 170 |
| IV | 505 | 430 | 360 | 320 | 280 | 250 | 230 | 200 |

TABLE II

| FLOW BEHAVIOR INDEX, n' VS TIME AT 250° F. | | | | | | | | |
|---|---|---|---|---|---|---|---|---|
| Sample | 1 hr | 2 hr | 3 hr | 4 hr | 5 hr | 6 hr | 7 hr | 8 hr |
| I | 0.610 | 0.630 | 0.655 | 0.680 | 0.705 | 0.730 | 0.755 | 0.780 |
| II | 0.590 | 0.605 | 0.625 | 0.645 | 0.660 | 0.680 | 0.695 | 0.715 |
| III | 0.585 | 0.595 | 0.605 | 0.615 | 0.630 | 0.640 | 0.650 | 0.660 |
| IV | 0.565 | 0.572 | 0.580 | 0.585 | 0.590 | 0.600 | 0.605 | 0.615 |

TABLE III

| CONSISTENCY INDEX, K' VS TIME AT 250° F. | | | | | | | | |
|---|---|---|---|---|---|---|---|---|
| Sample | 1 hr | 2 hr | 3 hr | 4 hr | 5 hr | 6 hr | 7 hr | 8 hr |
| I | 0.041 | 0.03 | 0.023 | 0.018 | 0.014 | 0.011 | 0.0085 | 0.0067 |
| II | 0.052 | 0.04 | 0.033 | 0.027 | 0.021 | 0.019 | 0.016 | 0.0135 |
| III | 0.079 | 0.062 | 0.050 | 0.040 | 0.035 | 0.029 | 0.025 | 0.020 |
| IV | 0.100 | 0.080 | 0.066 | 0.055 | 0.048 | 0.040 | 0.037 | 0.031 |

TABLE IV

| APPARENT VISCOSITY (CP) VS TIME AT 275° F. | | | | | | | | |
|---|---|---|---|---|---|---|---|---|
| Sample | 1 hr | 2 hr | 3 hr | 4 hr | 5 hr | 6 hr | 7 hr | 8 hr |
| I | 215 | 155 | 120 | 95 | | | | |
| II | 255 | 210 | 170 | 145 | 125 | 105 | 90 | 70 |
| III | 320 | 270 | 220 | 185 | 160 | 135 | 115 | 100 |
| IV | 390 | 320 | 260 | 220 | 190 | 155 | 145 | 125 |

TABLE V

| FLOW BEHAVIOR INDEX n' VS TIME AT 275° F. | | | | | | | | |
|---|---|---|---|---|---|---|---|---|
| Sample | 1 hr | 2 hr | 3 hr | 4 hr | 5 hr | 6 hr | 7 hr | 8 hr |
| I | 0.610 | 0.655 | 0.705 | 0.750 | | | | |
| II | 0.600 | 0.620 | 0.640 | 0.660 | 0.685 | 0.695 | 0.715 | 0.735 |
| III | 0.590 | 0.605 | 0.620 | 0.635 | 0.645 | 0.665 | 0.685 | 0.695 |
| IV | 0.585 | 0.590 | 0.595 | 0.605 | 0.610 | 0.615 | 0.625 | 0.630 |

TABLE VI

| CONSISTENCY INDEX, K' VS TIME AT 275° F. | | | | | | | | |
|---|---|---|---|---|---|---|---|---|
| Sample | 1 hr | 2 hr | 3 hr | 4 hr | 5 hr | 6 hr | 7 hr | 8 hr |
| I | 0.033 | 0.019 | 0.013 | 0.0071 | | | | |
| II | 0.041 | 0.030 | 0.023 | 0.018 | 0.0135 | 0.011 | 0.008 | 0.0058 |
| III | 0.055 | 0.042 | 0.033 | 0.025 | 0.020 | 0.0160 | 0.0125 | 0.0105 |
| IV | 0.068 | 0.053 | 0.043 | 0.035 | 0.029 | 0.0245 | 0.0205 | 0.0165 |

TABLE IV

| FLUID LOSS DATA | | |
|---|---|---|
| Hydratable Polymer Lb/1,000 Gal | Temp. °F. | $m \dfrac{cc}{(min)^{\frac{1}{2}}}$ |
| 30 | 250 | 7.5 |
| 30 | 250 | 1.68 |
| 35 | 250 | 6.84 |
| 35 | 250 | 1.64 |
| 40 | 250 | 6.04 |
| 40 | 250 | 1.3 |
| 45 | 250 | 5.58 |
| 45 | 250 | 1.3 |
| 30 | 275 | 7.30 |
| 30 | 275 | 1.76 |
| 35 | 275 | 7.12 |
| 35 | 275 | 1.7 |
| 40 | 275 | 6.52 |
| 40 | 275 | 1.64 |
| 45 | 275 | 6.10 |
| 45 | 275 | 1.48 |

An invention has been provided with significant advantages. By providing a cross-linking system which includes a mixture of a boron constituent and a titanate constituent, a fracturing fluid can be provided with increased shear stability with no loss of temperature stability. The improved cross-linking system provides a higher stable fluid viscosity with less hydratable polymer thereby providing an economical alternative to many of the available fracturing fluids. The viscosity generated by the system allows the creation of wide fractures and provides a fluid which will carry high proppant concentrations. The improved water based fracturing fluid has low turbulent friction pressure losses. The fracturing fluid using the novel cross-linking system shows temperature stability up to about 300° F. for eight hours, thereby allowing for longer pumping times. The fracturing fluid of the invention can be prepared with water containing sodium chloride, potassium chloride, or light brines which helps minimize damage to water-sensitive formation clays.

While the invention has been shown in only four of its forms, it is not thus limited but is susceptible to various changes and modification without departing from the spirit thereof.

I claim:

1. A water based fracturing fluid, comprising:
   water;
   a hydratable polymer capable of gelling in the presence of a cross-linking system, said polymer being selected from the group consisting of guars and derivitized guars, locust bean gum, karaya gum, carboxymethyl cellulose, carboxymethylhydroxyethyl cellulose, hydroxyethyl cellulose, and mixtures thereof;
   a liquid cross-linking system, said cross-linking system comprising a mixture of organotitanate constituent and a boron constituent in a liquid carrier, said organotitanate constituent comprising a mixture of two titanates, one of said titanates having a lactate base and the other of said titanates having a triethanolamine base, and said boron constituent being selected from the group consisting of alkali metal borates, alkaline earth metal borates, boric acid, and mixtures thereof; and
   wherein said hydratable polymer is present in said water based fracturing fluid in the range from about 20 to 50 pounds of hydratable polymer per 1,000 gallons of water used, and said liquid cross-linking system is added in the range of about 0.50 to 2.50 gallons of liquid cross-linking system per 1,000 gallons of water used.

2. The water based fracturing fluid of claim 1, wherein said hydratable polymer is hydroxypropyl guar.

3. The water based fracturing fluid of claim 1, wherein said boron constituent is selected from the group consisting of boric acid, borax, and mixtures thereof.

4. A method of fracturing a subterranean formation, comprising the steps of:
   blending together water and hydratable polymer capable of gelling in the presence of a cross-linking system to form a base fluid, said hydratable polymer being selected from the group consisting of guars and derivitized guars, locust bean gum, karaya gum, carboxymethyl cellulose, carbomethylhydroxyethyl cellulose, hydroxyethyl cellulose, and mixtures thereof;
   adding a liquid cross-linking system to said base fluid to cross-link said hydratable polymer, said cross-linking system comprising a mixture of an organotitanate constituent and a boron constituent in a liquid carrier, said mixture being effective to produce a cross-linked water based fracturing fluid which is shear stable at normal fracturing pump rates and temperature stable at elevated well temperatures, said organotitanate constituent comprising a mixture of two titanates, one of said titanates having a lactate base and the other of said titanates having a triethanolamine base, and said boron constituent being selected from the group consisting of alkali metal borates, alkaline earth metal borates, boric acid, and mixtures thereof;
   pumping the cross-linked water based fracturing fluid into the subterranean formation to fracture the formation;
   and wherein said hydratable polymer is present in said water based fracturing fluid in the range from about 20 to 50 pounds of hydratable polymer per 1,000 gallons of water used, and said liquid cross-linking system is added in the range from about 0.50 to 2.50 gallons of liquid crosslinking system per 1,000 gallons of water used.

* * * * *